(12) United States Patent
Hermanson et al.

(10) Patent No.: US 8,398,270 B2
(45) Date of Patent: Mar. 19, 2013

(54) ORNAMENT WITH DISPLAY HIDDEN WHEN INACTIVE

(75) Inventors: Leslie Hermanson, New York, NY (US); Huang Meng-Suen, Hong Kong (CN)

(73) Assignee: Mr. Christmas Incorporated, New York, NY (US)

( * ) Notice: Subject to any disclaimer, the term of this patent is extended or adjusted under 35 U.S.C. 154(b) by 467 days.

(21) Appl. No.: 12/727,657

(22) Filed: Mar. 19, 2010

(65) Prior Publication Data
US 2011/0227508 A1    Sep. 22, 2011

(51) Int. Cl.
*F21V 23/04* (2006.01)
*F21V 23/00* (2006.01)
(52) U.S. Cl. .................... 362/276; 362/135; 362/311.13; 362/140; 362/86; 40/219; 40/900
(58) Field of Classification Search .......... 362/135–144, 362/97.1–97.4, 276, 311.11, 311.13, 86; 40/219, 716, 717, 900
See application file for complete search history.

(56) References Cited

U.S. PATENT DOCUMENTS

| | | | | |
|---|---|---|---|---|
| 4,922,384 A | * | 5/1990 | Torrence | 40/219 |
| 5,657,563 A | * | 8/1997 | Lane | 40/219 |
| 2002/0126506 A1 | * | 9/2002 | Syme | 362/567 |
| 2006/0242867 A1 | * | 11/2006 | Choi | 40/219 |
| 2010/0053952 A1 | * | 3/2010 | Levon | 362/235 |

* cited by examiner

*Primary Examiner* — Mariceli Santiago
(74) *Attorney, Agent, or Firm* — Fitzpatrick, Cella, Harper & Scinto (57) ABSTRACT

An ornament of the present invention includes a display that is hidden behind a panel. An ornament body includes at least one panel which includes a two-way mirror and a display in the interior of the body. The ornament includes a light disposed in the ornament body which, when active, reveals the display which is otherwise hidden behind the two-way mirror. The light may be activated by a sensor that recognizes physical motion, and may also include a speaker to play music and a moving display element driven by a motor.

18 Claims, 6 Drawing Sheets

ORNAMENT WITH DISPLAY HIDDEN WHEN INACTIVE

FIELD OF THE INVENTION

This invention relates to decorative ornaments. In particular, the present invention relates to decorative ornaments primarily for use on Christmas trees and other display usages.

BACKGROUND OF THE INVENTION

As is well known, ornaments are often placed on Christmas trees for decoration. Also, decorative ornaments are commonly suspended from fixed structures located within homes or set up for display on stands. There are numerous different types of decorative ornaments used to decorate Christmas trees, wreaths and the like. A common version of a decorative ornament is a suspension ornament where the ornament includes an attachment for suspending the ornament from the item being decorated.

SUMMARY OF THE INVENTION

The present invention relates to a novel configuration of an ornament. In particular, the present invention relates to an ornament design with a display that is hidden behind a panel.

In one aspect, the ornament includes an ornament body. This body includes a two-way mirror and a cavity in the interior of the body. Thus, for example, a display may be disposed in the interior of the ornament body. A lighting system may also be disposed in the interior of the ornament body. As such, when the lighting system is on, the display may be visible through the two-way mirror. When the lighting system is off, however, the display is at least partially hidden behind the two-way mirror. Accordingly, the display will "magically" appear to an observer when the light source is activated.

Optionally, the ornament may also include a sensor. The sensor may be a motion sensor used to activate the display when the sensor detects physical motion. As such, the display will be hidden behind the two-way mirror when the no motion is detected by the sensor. However, when a person walks in the path of the sensor, motion is detected by the sensor and the light source of the display will be activated. Accordingly, the display behind the two-way mirror will "magically" appear to the person who is walking in the path of the sensor as the light source is activated.

In another aspect, the invention may include a switching element for selectively choosing an off state, an on state, or a presence detection state if a multi-state switch is used. As such, the user will be able to choose from a variety of display modes. The user may choose an off state in which the display remains hidden behind the mirrored surface in order to conserve energy. Alternatively, the user may choose an on state in which the display is persistently revealed from behind the mirrored surface. Finally, if a multi-state switch is used, the user may choose a presence detection state, in which the display is dynamically changed from an off state to an on state upon the detection of a physical presence in a detector path.

In another aspect, the ornament may also include a speaker for producing sound. The sound may be used to play prerecorded songs, which are stored in a storage unit, and may be turned on and off with the light source. The playing of music through the speaker may be coordinated with the activation of the light source so that a song begins playing when the display is revealed behind the mirrored surface by the light source. As such, when the song is over, the music stops and light source is de-energized, so that the display is hidden behind the mirrored surface.

The ornament display may also include active display elements. The display may include, for example, a moving display element. The moving display element may be driven by a motor. A moving display element may include a rotating display portion which circles a non-moving display portion. For example, the rotating display portion may be in the shape of a train, such that the moving train circles a non-moving display portion which is in the shape of a tree or a building. The display may also include other fixed or moving portions. The display may also include secondary lighting for providing decorative lighting throughout the display, separate from the lighting intended to reveal the display through the two-way mirror. The decorative lighting may be in the form of LEDs positioned to provide light to fiber optic strands.

In another aspect of the invention, the ornament may also include a control system in the body of the ornament. The control system may be coupled to many other elements of the ornament, including a switch, a sensor, a light source, a motor, and a speaker. As such, the control system may control the activation of the light source, the motor, and/or the speaker in response to a signal from a switch and/or a sensor.

The body of the ornament may also include a hanging element. This hanging element may include an integrated hook or loop positioned near the top of the ornament. The hanging element may also be a hoop element for running a hook, a ribbon, a string, or another element to allow the ornament to be suspended. Alternatively, the body of the ornament may be designed so that the ornament can be displayed on a stand. In particular, the body of the ornament may be designed so that a base of the ornament body rests inside of a top portion of a stand or so that the top portion of the stand portion rests inside of the ornament body, in order to hold the ornament for display.

BRIEF DESCRIPTION OF THE DRAWINGS

FIGS. 1(A-C) show multiple versions of a magic ornament including a two-way mirror according to a preferred embodiment of the invention.

FIGS. 2(A-B) shows the transition of a magic ornament as it transitions from a display-hidden state to a display-revealed state.

DETAILED DESCRIPTION OF THE PREFERRED EMBODIMENTS

Figure 1A:
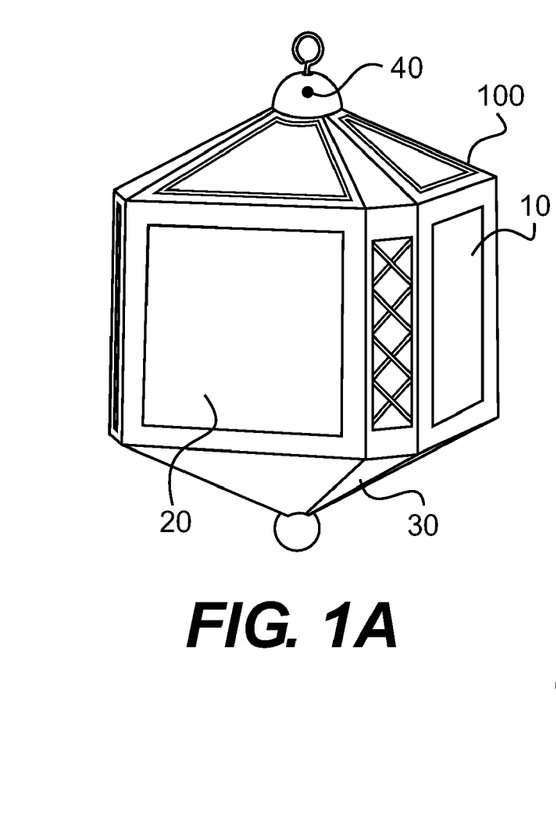

FIG. 1A shows a magic ornament in accordance with an exemplary preferred embodiment of the invention. The ornament body 100 includes at least one two-way mirror 20, which conceals a cavity in the interior of the ornament body. The ornament body may also include other mirrors 10 that are not two-way mirrors. Alternatively, the ornament body 100 may be made of a plurality of panels including at least one mirrored panel that is a two-way mirrored panel 20, which conceals a cavity in the interior of the ornament body, and may also include other mirrored panels 10 that are not two-way mirrored panels. Preferably, the mirrors 10 and 20 surround the display enclosed in the ornament body.

Optionally, the ornament body may also include a number of embellishments, including lines, shapes, and recessed portions, to make the ornament body more aesthetically pleasing. The ornament body may include a detachable lower portion 30 which conceals a control system of the ornament. The ornament body may also include an integrated sensor 40. The integrated sensor is preferably positioned on the ornament body such that an observer would not ordinarily notice the sensor.

Figure 1B:
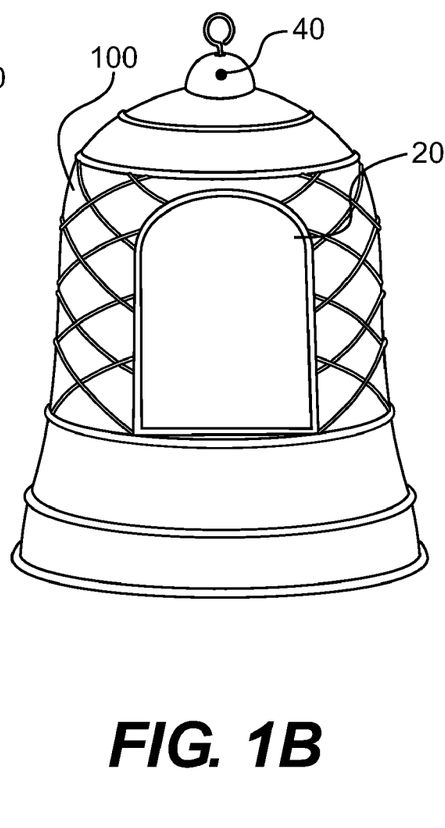
Figure 1C:
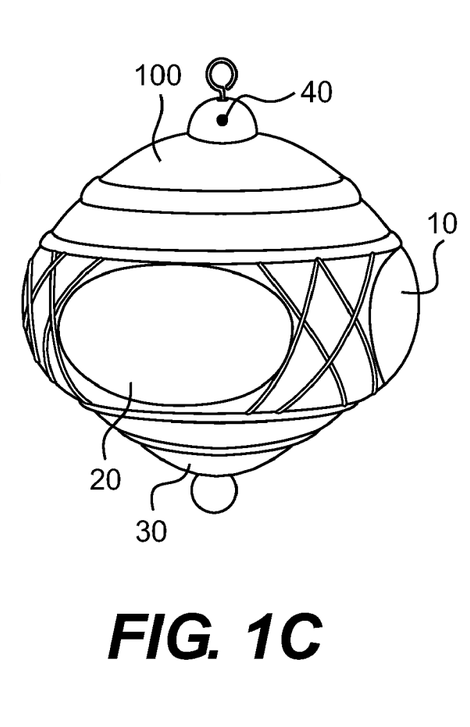

The ornament shown in FIG. 1 is merely exemplary. FIGS. 1B and 1C show alternative examples of an ornament body. These alternatives show the use of mirrored panels in differently shaped ornaments. These mirrored panels may be flat or contoured to the shape of a rounded ornament body.

A two-way mirror, also called a one-way mirror by some, is often used to provide one-way observation. To create a two-way mirror, typically, a pane of glass or plastic used for mirrors has two surfaces suitable for the tinting process known as silvering. The first surface is the outermost layer of the front side and the second surface is directly behind the thickness of the mirror pane. For traditional mirrors, such as mirror 10, a layer of reflective metal such as silver, tin or nickel is applied to the second surface, often with a second coating of paint to completely darken the back of the mirror pane. All light is reflected back through the pane to an observer in front of the mirror.

On the other hand, a two-way mirror, such as mirror 20, includes a very thin layer of metal or reflective acrylic which is applied to the first surface of the glass pane. As such, when a two-way mirror is installed between two spaces, it will look similar to a traditional mirror. When a light source is activated behind the two-way mirror, however, the two-way mirror reveals what is behind the mirror.

In order to get the maximum benefit from a two-way mirror, the space on the mirrored side must be significantly brighter than the side hidden behind the mirror. With the ornament of the present invention, the cavity in the interior of the ornament body is normally dark, though the ornament will normally be in a lighted room. As such, the display in the cavity is usually well hidden when the ornament is in a well lit room. This pronounced difference in lighting levels which make the two-way mirror effect possible. When the lighting circumstances are reversed and the cavity in the ornament body is illuminated, a person observing the mirrored ornament can see directly into the cavity of the ornament. This effect is used to reveal a hidden display in the ornament of the present invention.

Figure 2A:
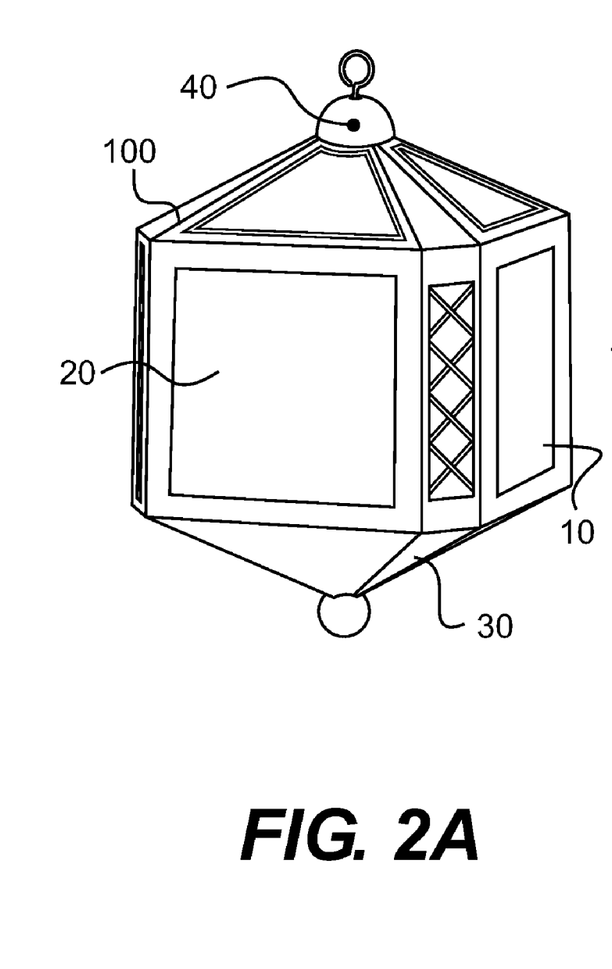
Figure 2B:
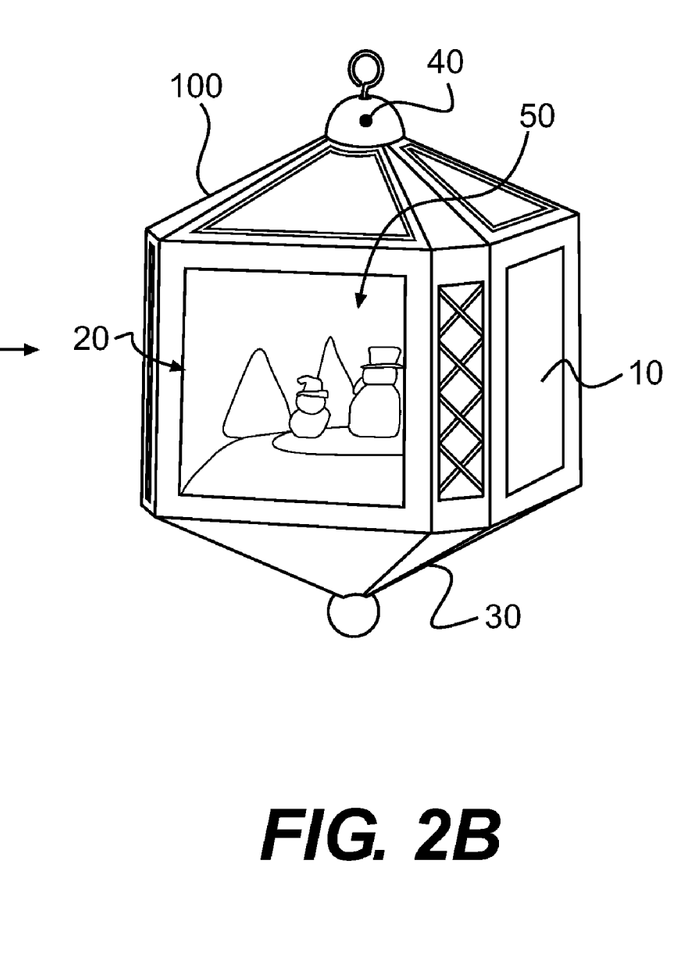

The ornament shown in FIGS. 2A and 2B includes a display that is hidden behind a two-way mirror when a light source is inactive. When a light source is activated behind the two-way mirror, however, the display is revealed.

Preferably, the hidden display of the present invention includes a stationary display portion and may include a rotating display portion. The rotating display portion may be in the middle of the stationary display portion. Alternatively, by using a system of gears, the rotating display portion may circle around at least part of the stationary display portion. More preferably, the present invention includes a secondary lighting source for illuminating a portion of the stationary display portion.

In FIG. 2A, the ornament of one embodiment of the present invention appears to be quite ordinary, in that it appears to be only a decorative body a plurality of mirrored panels. At least one mirrored panel, however, is a two-way mirrored panel 20. At least one light source is provided insides of the ornament body. As shown in FIG. 2B, when the light inside the ornament body 100 is activated, a display 50 inside the ornament body is revealed. The display 50 may come in many forms and may include a scene. A display scene may be movable, such that the display scene rotates when the display is activated. The revealing of the display may also be synchronized with music.

Figure 3:
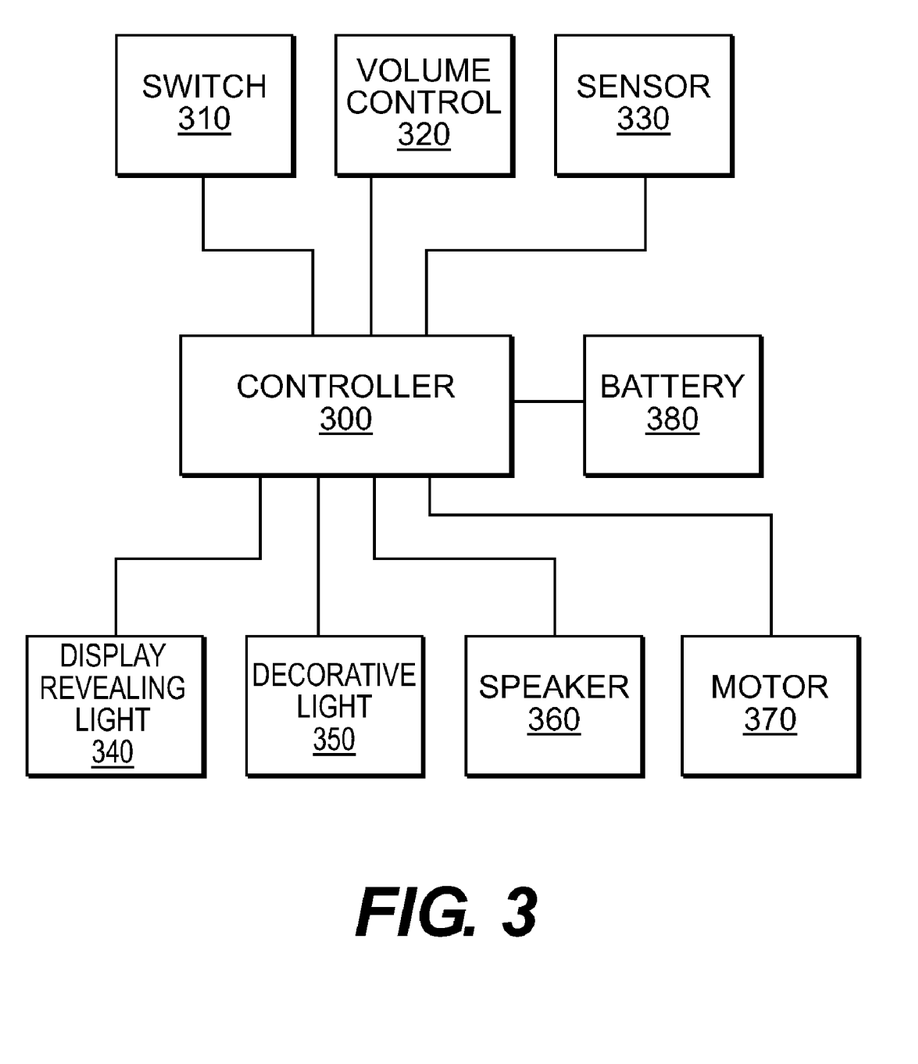
FIG. 3 depicts the control system of the magic ornament.

In FIG. 3, a control system for controlling the ornament is depicted. The control system includes a controller 300, which may be a microcontroller, processor, CPU or ASIC. The control system may include a switch 310, coupled to the controller 300, for controlling the power state of the ornament. A battery 380 is coupled to the control system controller. The switch 310 may be a simple on/off switch or may be a multi-state switch, for selecting between multiple types of powered states. The switch 310 is coupled to the controller 300 and, along with any other input controls such as volume control 320 and sensor 330, is used to control the output functions of the ornament. The output functions of the ornament include at least a display revealing light 340.

If a multi-state switch is used, the switch could include an off position, a continuous on position, and a presence detecting position. With such a switch, the ornament may be set in a continuous on state, in which the ornament functions are in a steady on state. When the switch 310 is set to this state, the controller 300 activates at least a display revealing light source 340, which reveals the display 50 positioned in the interior of the ornament body 100. If, however, the ornament is set in a presence detecting state, the ornament output functions are turned on and off based on the output of a sensor 330. The controller may include a timer for keeping the display revealing light source 340 for a predetermined period of time when the sensor detects an observers presence.

The display revealing light source 340 may include a single lighting element or multiple lighting elements. For example, the display revealing light source 340 may include multiple LEDs, placed in order to more evenly light a display 50. Utilizing multiple lighting elements also allow the lighting elements to be positioned in a manner to evenly illuminate the display to eliminate shadows while also being positioned such that an observer of the display does not see the lighting elements themselves. Preferably, the display revealing light source 340 directed at the display 50 from a position hidden from a viewer. If, for example, two LEDs are located near the front of a ceiling portion of a display cavity, the LEDs will not be easily visible to an observer of the ornament. In addition, it is preferred that the display revealing light source be directed away from the two-way mirror and the position of the observer.

The cavity of the display and the display itself may be made of materials that enhance certain features of the display revealing ornament. The part of the ornament body surrounding the display cavity may be colored white to improve the brightness of the display, or may be colored black to improve the effect of hiding the display. Other features of the display may also be colored or made of materials to enhance the visual characteristics of the display. For example, the bottom portions of the display may be made or coated with partially reflective or diffusive surfaces in order to simulate the appearance of freshly fallen snow. Preferably, the display revealing light 340 is directed towards elements of the display coated with a partially reflective or diffusive surface.

The sensor may be a motion detecting sensor for detecting motion of, for example, an observer walking by the ornament. When the switch 310 is set to this state and the sensor 330 detects motion, the controller 300 activates at least a display revealing light 340, which reveals the display 50 positioned in the interior of the ornament body 100. If the sensor 330 does not detect motion, however, the controller 300 does not activate any output functions of the ornament. As the display revealing light 340 is not activated, so the display 50 is not revealed, but rather, is hidden in the interior of the ornament body 100 behind the two-way mirror 20. Preferably, the sensor is positioned to detect motion in front of at least one two-way mirror. More preferably, the sensor is orientated to face toward the area in which motion is detected.

The controller 300 may be coupled to output functions other than the display revealing light. Additional output functions of the ornament may include a decorative light 350, a speaker 360, and a motor 370. These output functions may be turned on and off in the same manner as the display revealing light 340, or may be controlled through additional switches or other control elements. For example, a speaker 360 for playing music may be activated by the switch, but also controlled by the volume control 320, which may be a knob or wheel for adjusting the volume. The volume control may be adjusted so that the output of the speaker is as loud as desired or turned down so that the speaker has no output. The controller may be coupled to a battery unit 380 for supplying power to the ornament.

The speaker 360 can be controlled by the controller 300 to continuously play music, or may be limited to play one song depending on the state set by the switch 310. The speaker can play prerecorded music stored on a storage medium. The storage medium may be one of many known types of electronic memory devices and may be used to store multiple songs. As such, the speaker 360 can be controlled by the controller 300 to play songs in a predetermined order or a song to be played may be selected at random by the controller 300.

The controller 300 may control the speaker 360 to continuously output music when a multi-state switch is set to the on state, or may control the speaker to play one song and then turn off when the multi-state switch is set to a presence detection state and a motion sensor 330 detects motion indicating the presence of an observer. As such, when an observer is detected, the display 50 can be revealed while the speaker outputs a song, and then hidden behind the two-way mirror 20 when the song ends. The output of other output elements may also be controlled or adjusted with additional control elements. For example, the sensitivity of the sensor may also be controlled by a control element.

Figure 4:
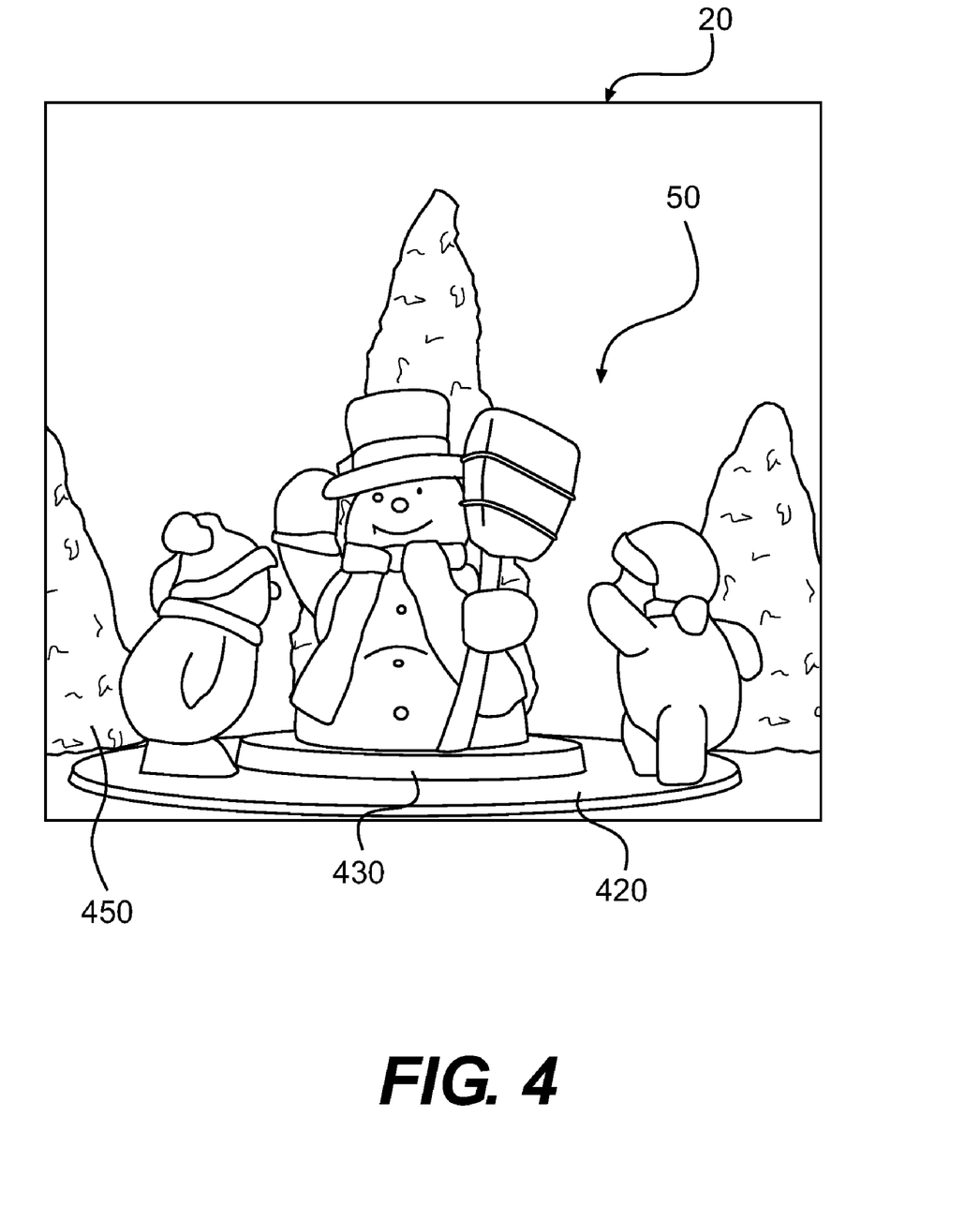
FIG. 4 depicts a close-up view of the display in the interior of the ornament body.

The display 50 may also include an scene, which may be animated. For example, the display 50 may include fixed decorative elements such as decorative tree elements 450 shown in FIG. 4. The scene may also include other fixed decorative elements or moving decorative elements. The scene may also include, for example, a fixed snowman decorative element and moving snowman decorative elements. As such, it is possible to simulate the appearance of a plurality of known themes or holiday related scenes. These themes may include moving children or snowmen dancing around a fixed snowman 430 (as shown in FIG. 4), a train circling a tree or train station, or a horse drawn sled circling in the trees or around a church. The animated scene is driven by a motor 370 hidden within the ornament body 100. The motor 370 may provide the power to move the entire display scene or a portion of the display scene. As shown in FIG. 4, the motor may move a ring portion 420 to allow certain decorative elements disposed on the ring portion to move around a fixed decorative element 430. The motor may transfer power to a gear or plurality of gears coupled to the ring portion. All these mechanisms are preferably positioned below the scene.

The display 50 may also include other light sources in addition to the display revealing light source. For example, the display 50 may include decorative tree elements 450, such as those show in FIG. 4. These decorative tree elements may have fiber optic strands positioned such that one end of the strands are positioned near the outer surface of the trees. As such, it is possible to simulate the appearance of decorative lighting elements in the trees by providing decorative light source 350 at the other end of the fiber optic strands. The decorative light source 350 may be an LED, including a colored LED.

A decorative light source 350 may be provided for each tree, so that the trees appear to be lighted with lights of different colors. Decorative light source may be a single lighting element or multiple lighting elements, including lighting elements of different colors. As such, the multiple lighting elements may provide light of different colors to one end of different sets of fiber optic strands. Preferably, for providing light to a plurality of points in said display and directed toward said two-way mirror from a position visible to a viewer. Fiber optic strands may be placed so that the other ends of the strands are distributed to create the desired ornamental effect. By way of example, the ends of strands may distributed in the trees in the display, so that the trees look like they have been strung with lights. Alternatively, the ends of strands may distributed in or around buildings in the display, so that the buildings look like they have candles in windows. Preferably, decorative lights are directed toward the two-way mirror and the position of the observer.

Figure 5:
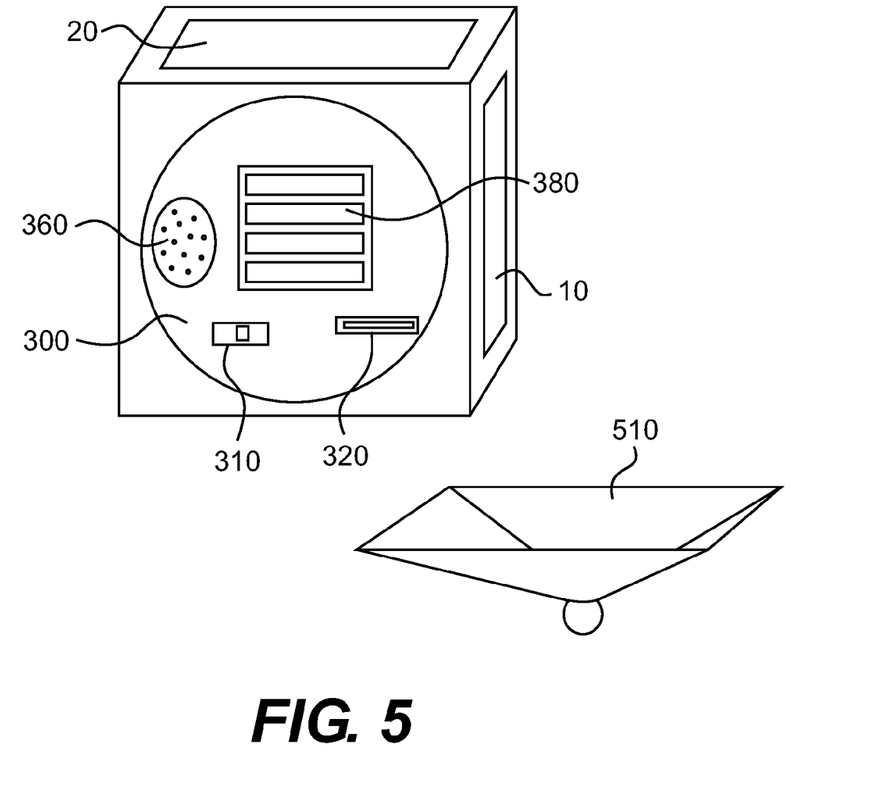
FIG. 5 shows a magic ornament body with a removable base portion for concealing a control system removed.

FIG. 5 shows a magic ornament body with a removable base portion 510, for concealing elements of the control system 300, removed. In this way, the visual appearance of the ornament may be improved by concealing control elements. Of course, the ornament body does not have to include a removable base portion. The ornament body may be designed in such a way that the elements of the control system are naturally concealed. For example, the bell shape, as shown in FIG. 1B, conceals the elements of the control system inside the mouth of the bell. As such, the elements of the control system are more easily accessible because it is not necessary to remove a cover to access them.

As shown in FIG. 5, the removable base portion 510 may also be utilized for concealing a battery unit 380. The battery unit may include a battery compartment for holding batteries in place and concealing the batteries. The battery compartment may include an compartment cover, which may be concealed by the removable base portion of the ornament. Alternatively, the ornament may be designed such that battery compartment and battery compartment cover are naturally concealed from the observer, though easily accessible in order to allow batteries to be changed.

Figure 6:
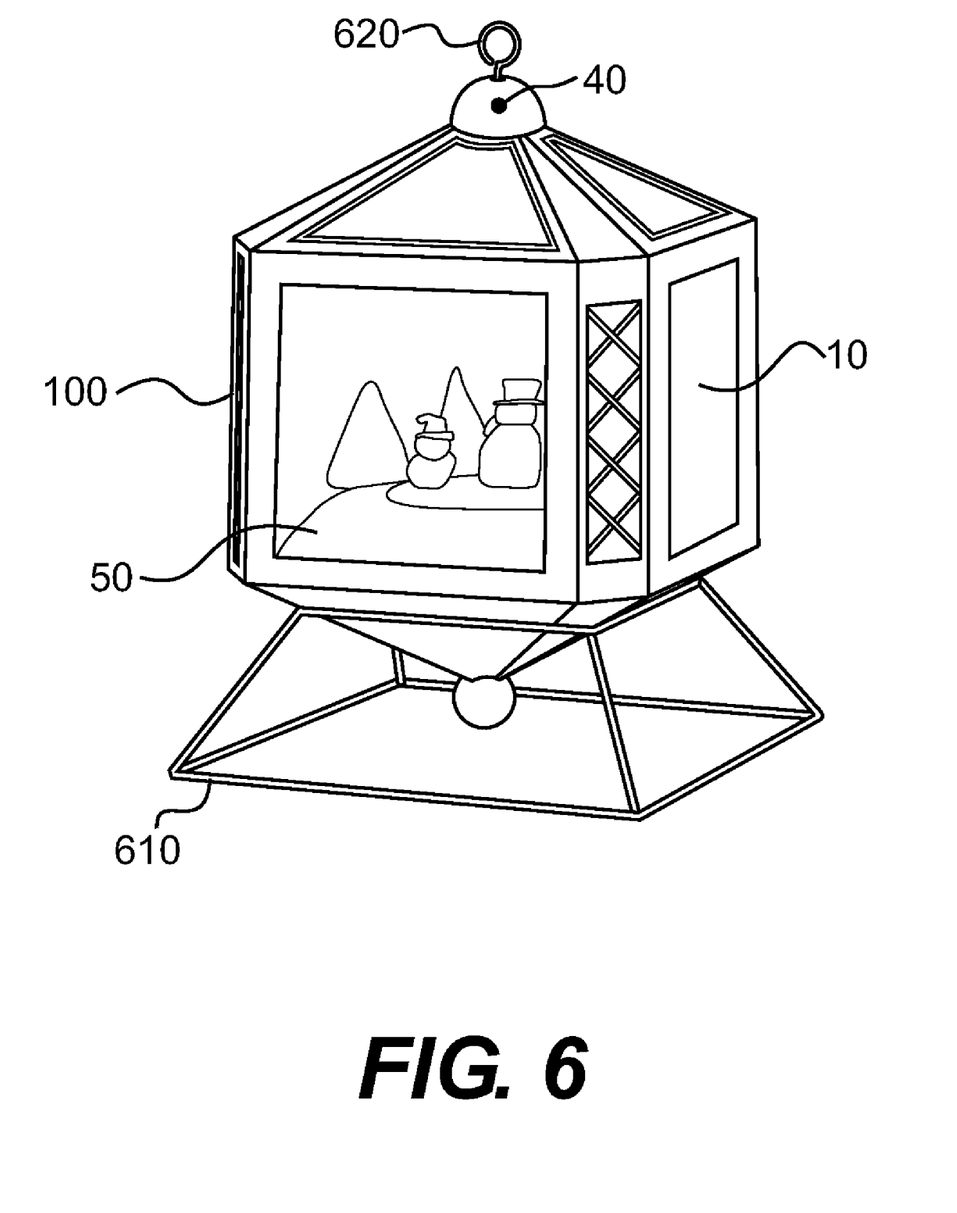
FIG. 6 shows the ornament body displayed on a stand.

FIG. 6 shows the ornament body 100 display on a stand 610. When using a stand the sensor 40 may be more easily positioned to face a particular direction. This allows the ornament to be positioned in areas that have irregular motion patterns. As such, when the ornament is set in a presence detecting state, the display is hidden until the motion of an observer is detected by the sensor, at which point the display is "magically " revealed. Alternatively, the ornament may be hung from a hanging element 620.

As for preferred materials, the ornament body 100 may be made of plastic in order to keep the ornament light enough to hang from a wide variety of objects. For example, light weight is preferable so that the ornament may be hung from a tree branch. Of course, the ornament may be made out of other materials, such as metal if increased durability is desired. In the same way, the light sources may be selected from a variety of known elements, which may be selected to based on color, size, cost, or energy efficiency.

The embodiments discussed herein are representative of preferred embodiments of the present invention and are provided for illustrative purposes only. They are not intended to limit the scope of the invention. Although specific configurations, structures, materials, etc. have been shown and described, such are not limiting. Modifications and variations are contemplated within the scope of the invention, which is intended to be limited only by the scope of the accompanying claims.

What is claimed is:

1. An ornament with a hidden display, the ornament comprising:
   an ornament body;
   a display unit located in a cavity in said ornament body, said display unit comprising an animated scene including at least a rotating portion and a stationary portion;
   at least one two-way mirror panel; and
   a light source,
   wherein when, said light source is turned off, said display unit is hidden behind said at least one two-way mirror panel, and when said light source is turned on, said display unit behind said at least one two-way mirror panel is revealed and said rotating portion of said animated scene rotates.

2. The ornament of claim 1, wherein said light source is located in an upper portion of the cavity in said ornament body and is directed to illuminate said display unit.

3. The ornament of claim 1, the ornament further comprising:
   a prerecorded music storage medium for storing at least one song; and
   a speaker for playing at least one song when said light source is turned on.

4. The ornament of claim 1, the ornament further comprising a sensor for detecting a presence of an observer,
   wherein when said sensor detects the presence of the observer, said light source is turned on.

5. The ornament of claim 4, the ornament further comprising:
   a speaker for playing at least one song when said light source is turned on; and
   a prerecorded music storage medium for storing at least one song,
   wherein when said sensor detects the presence of the observer, said light source is turned on and said speaker plays at least one song, and
   wherein when said sensor no longer detects the presence of the observer, said light source is turned off when the song being played on said speaker is complete.

6. The ornament of claim 1, wherein said light source of the ornament is a primary light source for illuminating the cavity locate in the ornament body to reveal said display unit behind said panel including a two-way mirror, said display unit further comprising:
   a scene; and
   a secondary light source including multiple light elements and fiber optic strands for delivering light from said multiple light elements to a variety of points throughout said scene, wherein said secondary light source is turned on when said primary light source is turned on.

7. The ornament of claim 1, the ornament further comprising a sensor and a multi-state switch for controlling the power to at least said light source,
   wherein when the multi-state switch is set in an on state, power is continuously provided to at least said light source,
   wherein, when the multi-state switch is set in a sensing state and said sensor detects the presence of the observer, said light source is turned on, and when the multi-state switch is set in a presence detecting state, said light source is turned on when said sensor detects the presence of the observer and said light source is turned off within a predetermined period of time when said sensor no longer detects the presence of the observer.

8. The ornament of claim 1, the ornament further comprising a removable cover portion attachable to said ornament body, wherein said removable cover portion conceals a control unit for controlling said light source.

9. An ornament, the ornament comprising:
   an ornamental body;
   a display located in said ornamental body;
   a two-way mirror integrally disposed in said ornamental body for concealing said display located in said ornamental body;
   a lighting element located in the interior of the ornamental body to illuminate said display;
   a controller for controlling a state of said lighting element such that (i) when said controller is in an off state, said lighting element is not powered and said display is hidden behind said two-way mirror, and (ii) when said controller is in an on state, said controller provides power to said lighting element and said display located behind said two-way mirror is revealed; and
   a sensor which is coupled to said controller,
   wherein said controller can be operated in a plurality of modes including an on mode in which said controller is always in the on state, an off mode in which said controller is always in the off state, and a presence detecting mode in which said controller is switched between the on state and the off state based on input to said controller from said sensor.

10. The ornament of claim 9, the ornament further comprising a speaker, wherein said speaker plays music when said controller is in the on state.

11. The ornament of claim 9, the ornament further comprising a sensor,
    wherein when said sensor detects the presence of the observer, said controller is placed in the on state, and
    wherein when said sensor no longer detects the presence of the observer, said controller is placed in the off state within a predetermined period of time.

12. The ornament of claim 9, wherein when the ornament is in the presence detecting mode and said sensor detects motion said controller is placed in the on state, and when the ornament is in the presence detecting mode and said sensor no longer detects motion said controller is placed in the off state within a predetermined period of time.

13. The ornament of claim 9, the ornament further comprising a battery to supply power to the activate at least said lighting element when said controller is in an on state.

14. The ornament of claim 9, said lighting element further comprising:
    a primary light source for illuminating said display behind said two-way mirror and directed at said display from a position hidden from a viewer; and
    a secondary light source for providing light to a plurality of points in said display and directed toward said two-way mirror from a position visible to a viewer.

15. The ornament of claim 9, the ornament further comprising a removable cover portion for concealing said controller inside the ornament body when said removable cover portion is attached to said ornament body.

16. The ornament of claim 9, the ornament further comprising:
- a plurality of traditional mirrors;
- a hanging element; and
- a stationary scene portion including stationary scene elements which do not move;
- a rotating scene portion including rotating scene elements which move when the primary light source is active;
- a motor for providing a rotating force to the rotating scene portion;
- a secondary light source including multiple light elements of different colors, wherein said secondary light source is active when said primary light source is active;
- wherein said controller is coupled to at least said sensor, said primary light source, said secondary light source, and said motor, said controller further comprising:
  - a prerecorded music storage medium for storing at least one song;
  - a speaker for playing at least one song stored on said prerecorded music storage medium when said light source is turned on;
  - a volume control unit for controlling the output level of the speaker,
  - a battery unit; and
  - a multi-state switch which can be set in at least the off mode, the on mode and the presence sensing mode.

17. The ornament of claim 16, the ornament further comprising a removable cover portion, which is substantially visually symmetric with at least another portion of said ornament body, for concealing said controller when attached to said ornament body.

18. An ornament, the ornament comprising:
- an ornamental body;
- a display located in said ornamental body;
- a two-way mirror integrally disposed in said ornamental body for concealing said display located in said ornamental body;
- a lighting element located in the interior of the ornamental body to illuminate said display; and
- a controller for controlling a state of said lighting element such that (i) when said controller is in an off state, said lighting element is not powered and said display is hidden behind said two-way mirror, and (ii) when said controller is in an on state, said controller provides power to said lighting element and said display located behind said two-way mirror is revealed,
- wherein at least a portion of said display inside the ornament is movable, the ornament further comprising a motor for providing a moving force to said movable portion of said display when said controller is in the on state.

* * * * *